United States Patent
Saito et al.

(10) Patent No.: US 6,948,236 B2
(45) Date of Patent: Sep. 27, 2005

(54) SIDE PANEL ASSEMBLY LINE

(75) Inventors: Hideo Saito, Sayama (JP); Yuichi Hirata, Sayama (JP); Satoru Matsuo, Sayama (JP); Masayuki Fukumori, Sayama (JP); Shinji Ikeda, Sayama (JP); Makoto Urano, Sayama (JP); Kazunao Uchiyama, Sayama (JP); Takeshi Endo, Sayama (JP); Chitoshi Kato, Sayama (JP); Hidetaka Murai, Sayama (JP); Yuki Mori, Sayama (JP); Yukihiro Yaguchi, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 201 days.

(21) Appl. No.: 10/275,063

(22) PCT Filed: May 1, 2001

(86) PCT No.: PCT/JP01/03772

§ 371 (c)(1),
(2), (4) Date: Jan. 6, 2003

(87) PCT Pub. No.: WO01/83285

PCT Pub. Date: Nov. 8, 2001

(65) Prior Publication Data

US 2003/0115746 A1 Jun. 26, 2003

(30) Foreign Application Priority Data

| May 1, 2000 | (JP) | 2000-132381 |
| Mar. 3, 2001 | (JP) | 2001-101201 |
| Mar. 30, 2001 | (JP) | 2001-101202 |

(51) Int. Cl.$^7$ .............................................. B23P 21/00

(52) U.S. Cl. ............................... 29/783; 29/771; 29/787

(58) Field of Search .......................... 29/783, 787, 795, 29/822, 791, 525.14, 429, 430, 771; 228/47.1, 182

(56) References Cited

U.S. PATENT DOCUMENTS

| 4,813,587 A | 3/1989 | Kadowaki et al. |
| 5,518,166 A | * 5/1996 | Numata et al. ............. 228/182 |

FOREIGN PATENT DOCUMENTS

JP  5-124549 A  5/1993

* cited by examiner

Primary Examiner—John C. Hong
(74) Attorney, Agent, or Firm—Birch, Stewart, Kolasch & Birch, LLP

(57) ABSTRACT

A car side panel assembly line capable of increasing a productivity by shortening an operation time and having a set station ST2, a welding station ST3, and a next operation station ST4 disposed in series in this order, comprising a set carriage $9_1$ having, thereon, a set jig 91 capable of holding the side panel W in upright attitude from the side and installed reciprocatingly between the set station ST2 and the welding station ST3 and a frame carriage $8_1$ having a lower frame 80 and an upper frame 81, capable of holding, between both frames 80, 81, the side panel W in upright attitude through clamp members ($82_1$, $82_2$, $82_3$, $83_1$, $83_2$, $83_3$) mounted on the frames 80, 81, installed reciprocatingly between the welding station ST3 and the next operation station ST4, and allowing to exchange the side panel W with the set carriage $9_1$.

8 Claims, 15 Drawing Sheets

SIDE PANEL ASSEMBLY LINE

TECHNICAL FIELD

The present invention relates to an assembly line for assembling side panels for automobiles.

BACKGROUND ART

One conventional side panel assembly line of the type described above is known from Japanese laid-open patent publication No. 62-263876. The technology disclosed in the above publication is concerned with an automobile side panel assembly line having a setting station, a welding station, and a next working station which are arranged successively in a series in the order named, the automobile side panel assembly line comprising a first setting carriage reciprocally movable between the setting station and the welding station, and a second setting carriage reciprocally movable between the welding station and the next working station, the arrangement being such that a side panel can be transferred between a clamp member disposed in the welding station for holding the side panel and each of the setting carriages.

According to the technology disclosed in the above publication, constituent members of a side panel are set on the first setting carriage in the setting station, and the first setting carriage is moved to the welding station. In the welding station, the constituent members of the side panel are temporarily welded, and then transferred from the first setting carriage to the clamp member in the welding station. While the constituent members of the side panel are being held by the clamp member, the constituent members are additionally welded. During the additional welding process, the first setting carriage is moved back to the setting station where constituent members of a next side panel are set on the first setting carriage.

When the additional welding process is finished in the welding station, the second setting carriage is moved back to the welding station, and the constituent members of the side panel are transferred from the clamp member to the second setting carriage. Then, the second setting carriage is moved to the next working station.

While the second setting carriage is being moved to the next working station, the first setting carriage is moved to the welding station where the constituent members of the side panel are temporarily welded.

According to the technology disclosed in the above publication, therefore, the welding process in the welding station and the process of setting the constituent members of the side panel in the setting station are carried out parallel to each other. Consequently, side panels can be assembled sequentially for increased productivity.

However, the technology disclosed in the above publication is time-consuming and remains to be improved because, in the welding station, the constituent members of the side panel are transferred from the first setting carriage to the clamp member, and after the welding process is finished, the constituent members are transferred from the clamp member to the second setting carriage.

DISCLOSURE OF THE INVENTION

In view of the above drawbacks, it is an object of the present invention to provide an assembly line for assembling side panels for automobiles within a reduced working time for increased productivity.

To achieve the above object, there is provided a assembly line for assembling side panels for automobiles, having a setting station, a welding station, and a next working station which are successively arranged in a series in the order named, characterized by a setting carriage supporting a setting jig for laterally holding a side panel in an erected attitude, the setting carriage being reciprocally movable between the setting station and the welding station, and a frame carriage having a lower frame and an upper frame for holding therebetween a side panel in an erected attitude with clamp members mounted thereon, the frame carriage being reciprocally movable between the welding station and the next working station for transferring a side panel to and from the setting frame.

In the assembly line for assembling side panels for automobiles according to the present invention, the setting carriage is moved back to the setting station, where a side panel is set on the setting carriage. The setting carriage with the side panel set thereon is moved to the welding station.

Then, the frame carriage is moved back to the welding station, and the side panel is transferred from the setting carriage to the clamp members on the frames, after which the side panel is welded. While the side panel is being welded, the setting carriage is moved back to the setting station, where a next side panel is set on the setting carriage.

When the welding is finished, the frame carriage which is holding the side panel with the clamp members is moved to the next working station. While the frame carriage is being moved to the next working station, the set carriage with the next side panel set thereon is moved to the welding station. Then, the above process is repeated.

With the assembly line for assembling side panels for automobiles according to the present invention, therefore, there is no need to transfer the welded side panel from the clamp members to the setting carriage in the welding station. The operation time is thus reduced by the period of time which would be required to transfer the side panel from the clamp members to the setting carriage, for increased productivity.

The next working station may be a second setting station followed by a second welding station downstream thereof, or a discharging station for sending the side panel to a next process. If the next working station is a second setting station, then after the frame carriage is moved to the second setting station as the next working station, a second setting carriage is moved back to the second setting station from the second welding station disposed downstream of the second setting station. Then, the side panel is transferred from the frame carriage to the second setting carriage.

In the assembly line for assembling side panels for automobiles according to the present invention, the welding station has a welding robot disposed at least on one side of the side panel assembly line in the direction of the flow thereon, the setting carriage being positioned on a side of the welding robot opposite to the frame carriage and supporting the setting jig for movement in a direction perpendicular to the direction of the flow on the assembly line between a transfer position for transferring the side panel to and from the frame carriage and a withdrawn position for holding the side panel.

With the above arrangement, when the setting carriage is moved to the welding station and the frame carriage is moved back to the welding station, the setting carriage is positioned on the side of the welding robot opposite to the frame carriage. Then, the setting carriage advances the setting jig from the withdrawn position to the transfer position in the direction perpendicular to the direction of the flow on the assembly line. In the transfer position, the side panel is transferred between the setting carriage and the frame carriage, after which the setting carriage retracts the setting jig in the direction perpendicular to the direction of the flow on the assembly line, back to the withdrawn position.

Therefore, while the welding robot is welding the side panel held by the frame carriage, the setting carriage can be moved back to the setting station without interfering with the welding robot.

In the assembly line for assembling side panels for automobiles according to the present invention, the setting carriage and the frame carriage may hold left and right side panels separately or together.

If the setting carriage and the frame carriage hold left and right side panels separately, then the side panel assembly line may include a pair of separate assembly lines for assembling left and right side panels, and the separate assembly lines may be left and right symmetrical assembly lines. The left and right symmetrical assembly lines are capable of assembling left and right side panels parallel to each other.

The frame carriage may have a lower frame and an upper frame which are separate from each other, the lower frame and the upper frame being movable synchronously under synchronous control of respective drive sources independent of each other. If the drive sources are inactivated due to a fault such as a power failure or the like, the frames are displaced longitudinally from each other due to different inertial forces acting thereon. Therefore, the frame carriage should preferably incorporate a frame synchronizing arrangement for preventing the frames from being displaced longitudinally from each other owing to a fault.

The frame synchronizing arrangement may comprise, for example, a first endless movable member disposed along the path of movement of one of the frames for movement in unison with the one of the frames, a second endless movable member disposed along the path of movement of the other of the frames for movement in unison with the other of the frames, and belt-and-pulley transmitting means for connecting the endless movable members for synchronous movement thereof.

In the assembly line for assembling side panels for automobiles according to the present invention, if the setting carriage and the frame carriage hold left and right side panels together, then the frame carriage may comprise, for example, left and right lower frames, a portal-shaped frame disposed astride the lower frames, and an upper frame coupled to the portal-shaped frame, the setting carriage being disposed for being introduced between the lower frames of the frame carriage in the direction of the flow on the assembly line.

The assembly line for assembling side panels for automobiles according to the present invention is characterized in that in the welding station, the side panel is temporarily welded by the welding robot before the side panel is transferred from the setting carriage to the frame carriage, and the side panel is additionally welded after the side panel is transferred from the setting carriage to the frame carriage. With this arrangement, while the side panel held by the setting carriage is being temporarily welded, the frame carriage can be moved back to the welding station. After the side panel is transferred from the setting carriage to the frame carriage, while the side panel held by the frame carriage is being additionally welded, the setting carriage can be moved back to the setting station. Thus, the operation time may further be reduced for increased productivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BEST MODE FOR CARRYING OUT THE INVENTION

Embodiments of the present invention will be described in detail below with reference to the accompanying drawings.

Figure 1:
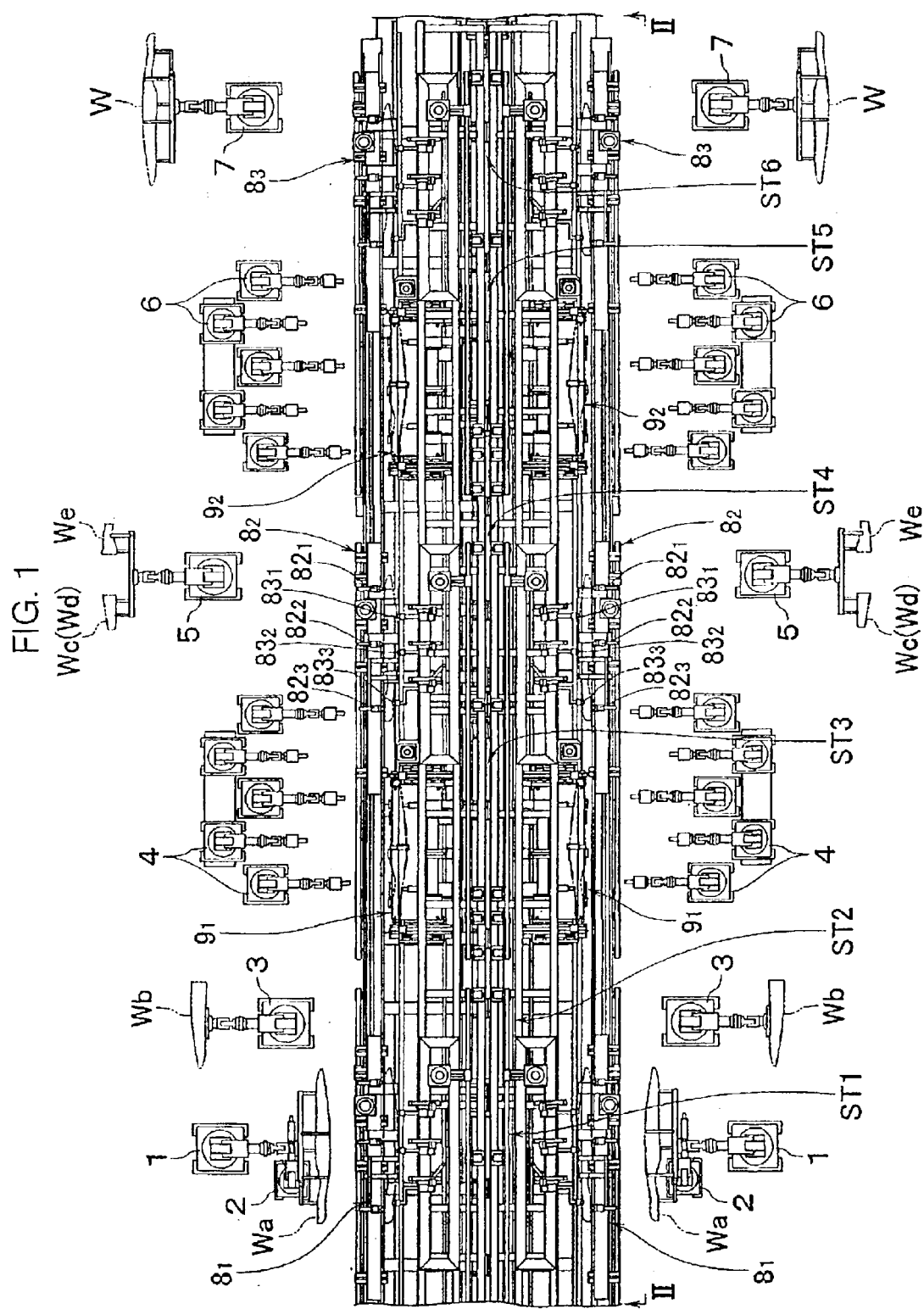
FIG. 1 is a plan view of an embodiment of an assembly line for assembling side panels for automobiles according to the present invention.
Figure 2:
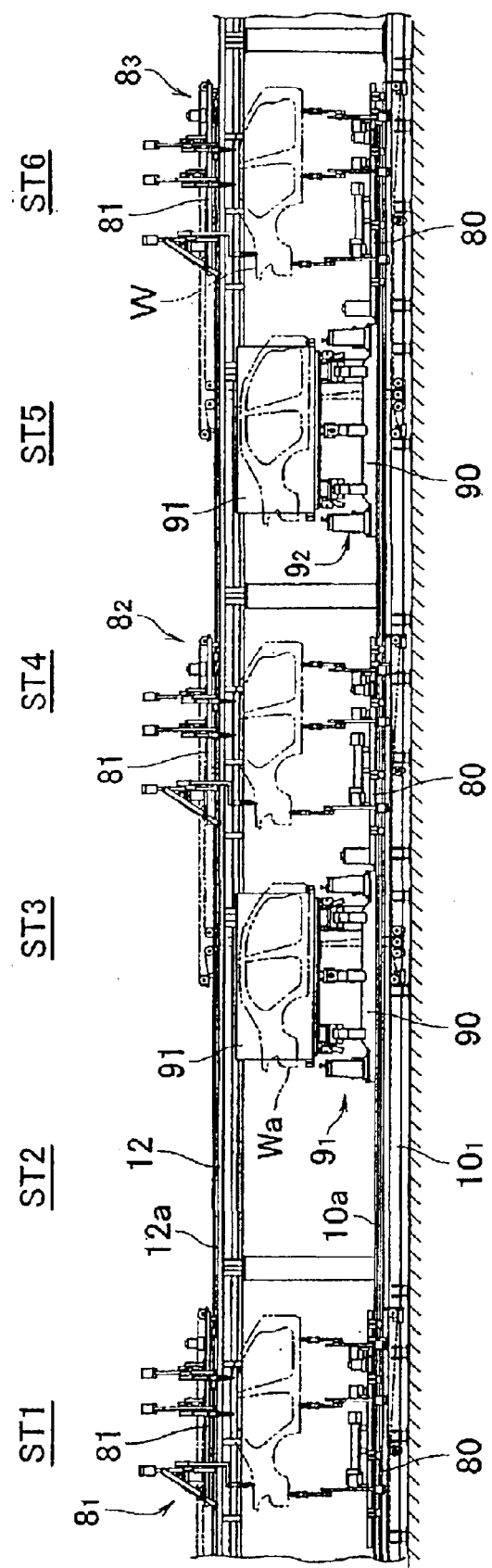
FIG. 2 is a side elevational view of the assembly line taken along line II—II of FIG. 1.
Figure 15:
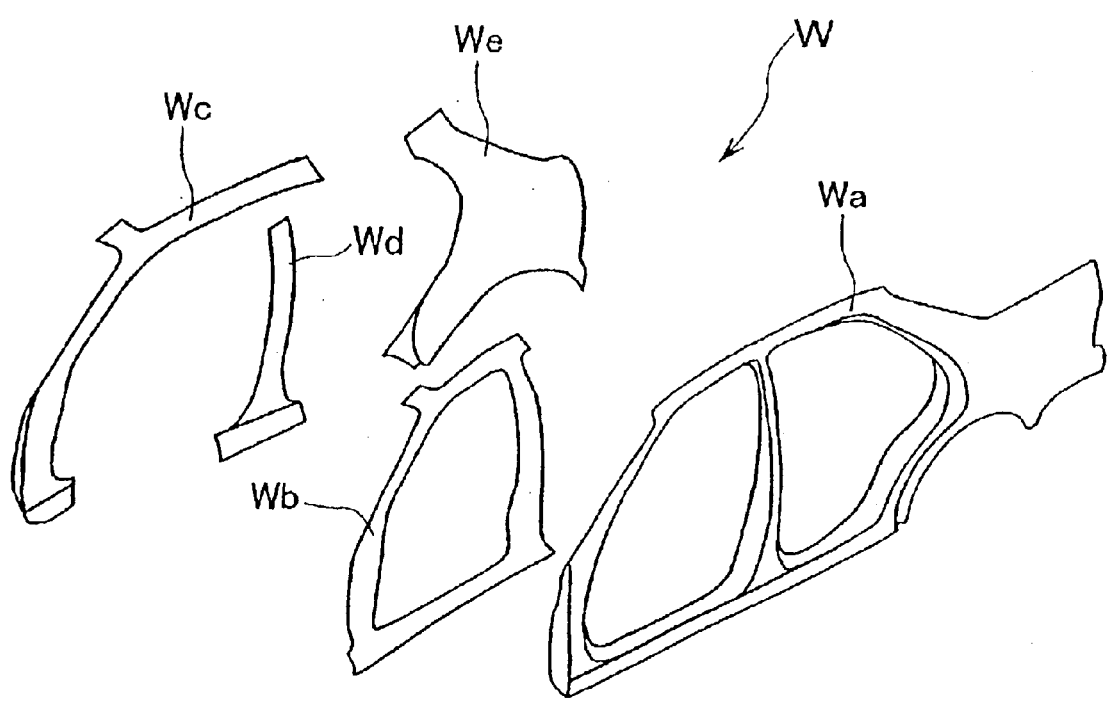
FIG. 15 is an exploded perspective view of a side panel for an automobile.

FIGS. 1 and 2 show a side panel assembly line (hereinafter abbreviated "assembly line") for assembling left and right side panels W, W for automobiles. As shown in FIG. 15, a side panel W is assembled by welding various inner members including an outer stiffener Wb, a front pillar inner member Wc, a center pillar inner member Wd, and a rear inner member We, to an outer skin Wa.

The assembly line has a pair of left and right symmetrical lines for assembling the left and right side panels W, W, respectively. Each of the assembly lines has a charging station ST1, a first setting station ST2, a first welding station ST3, a second setting station ST4, a second welding station ST5, and a discharging station ST6 which are arranged successively in a series in the order named from an upstream end of the line.

On each of the assembly lines, there are disposed working robots on one side thereof which are spaced in the direction of the flow on the line. The working robots include an outer skin charging robot 1 and a coating robot 2 in the charging station ST1, an inner member setting robot 3 disposed in the first setting station ST2, a welding robot 4 disposed in the first welding station ST3, an inner member setting robot 5 disposed in the second setting station ST4, a welding robot 6 disposed in the second welding station ST5, and a discharging robot 7 disposed in the discharging station ST6.

In the charging station ST1, the outer skin charging robots 1 charge outer skins Wa for the left and right side panels W, W. At the same time, the coating robots 2 coat the outer skins Wa with a sealing agent. In the second setting station ST2, the inner member setting robots 3 set inner members comprising outer stiffeners Wb on the outer skin members Wa. In the first welding station ST3, the welding robots 4 weld the outer stiffeners Wb to the outer skin members Wa. In the second setting station ST4, the inner member setting robots 5 set inner members comprising front pillar inner members Wc, center pillar inner members Wd, and rear inner members We on the outer skin members Wa. In the second welding station ST5, the welding robots 6 weld the inner members Wc, Wd, We to the outer skin member Wa, thus forming the side panels W. In the discharging station ST6, the discharging robots 7 discharge the left and right side panels W, W onto an overhead conveyor, not shown.

The side panel assembly line includes first through third pairs of left and right frame carriages $8_1$, $8_2$, $8_3$ and first and second pairs of left and right setting carriages $9_1$, $9_2$. The first frame carriages $8_1$ are initially positioned in the charging station ST1 and reciprocally movable between the charging station ST1 and the first setting station ST2. The first setting carriages $9_1$ are initially positioned in the first welding station ST3 and reciprocally movable between the first setting station ST2 and the first welding station ST3. The second frame carriages $8_2$ are initially positioned in the second setting station ST4 and reciprocally movable between the first welding station ST3 and the second setting station ST4 that serves as a next working station. The second setting carriages $9_2$ are initially positioned in the second welding station ST5 and reciprocally movable between the second setting station ST4 and the second welding station ST5. The third frame carriages $8_3$ are initially positioned in the discharging station ST6 and reciprocally movable between the second welding station ST5 and the discharging station ST6 which serves as a next working station.

Figure 3:
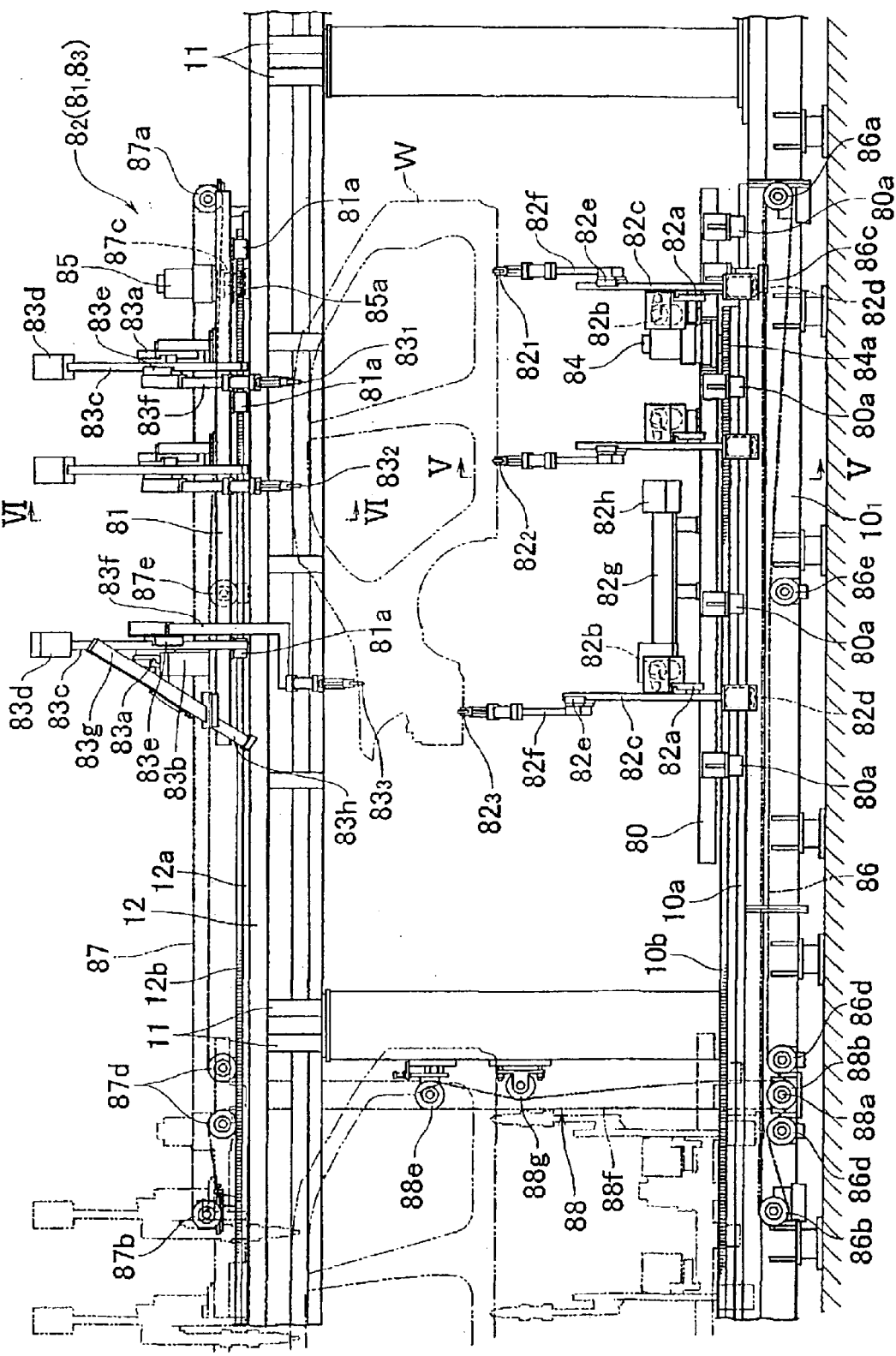
FIG. 3 is an enlarged side elevational view of a frame carriage shown in FIG. 2.
Figure 4:
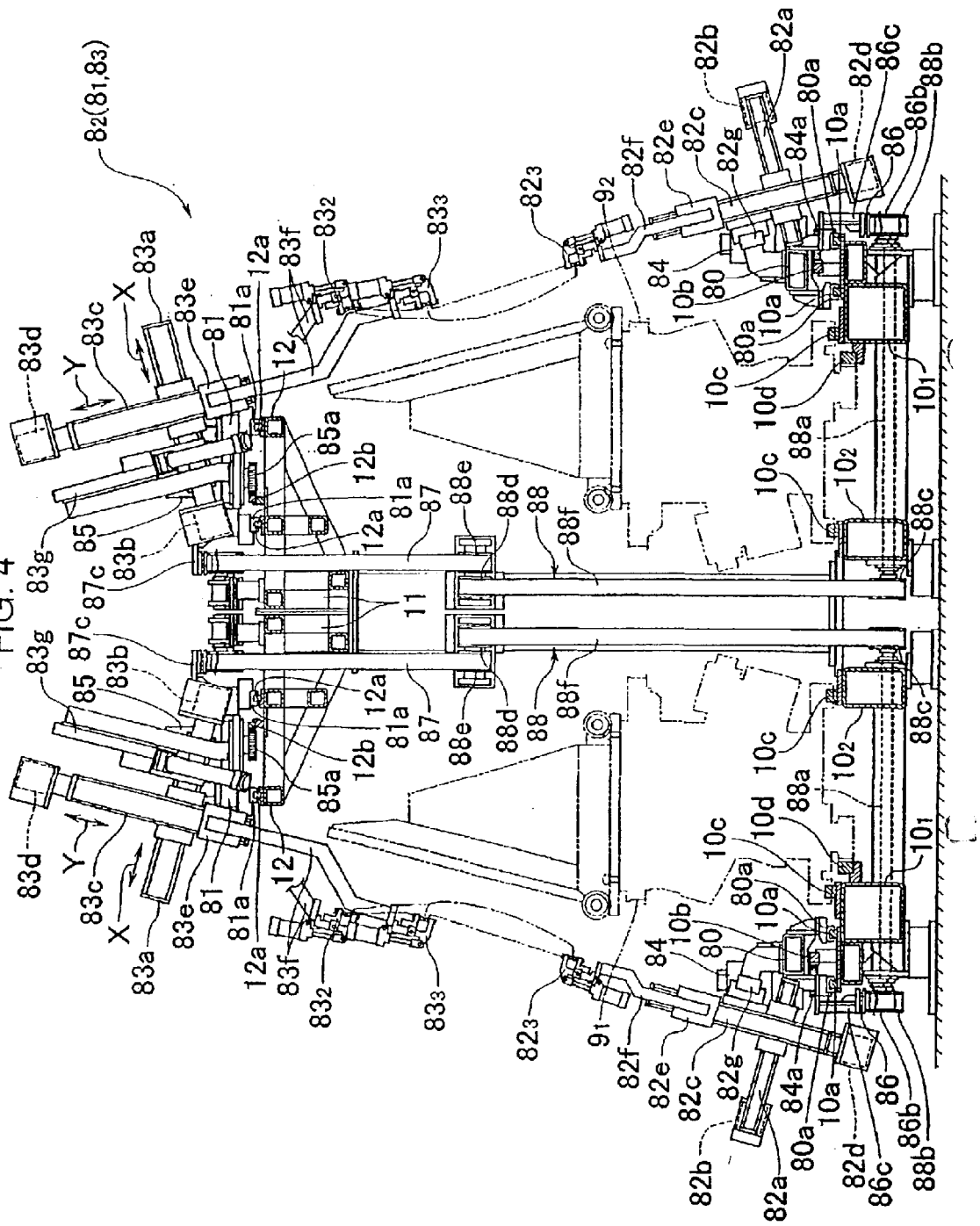
FIG. 4 is a front elevational view of the frame carriage as viewed from the left of FIG. 3.

As shown in FIGS. 3 and 4, each of the frame carriages $8_1$, $8_2$, $8_3$ has a lower frame 80 which is elongate in the longitudinal direction in the direction of the flow on the line and an upper frame 81 which is also elongate in the longitudinal direction. The lower frame 80 supports thereon three clamp members $82_1$, $82_2$, $82_3$ spaced in the longitudinal direction for clamping a lower edge of the side panel W, and the upper frame 81 supports thereon three clamp members $83_1$, $83_2$, $83_3$ spaced in the longitudinal direction for clamping an upper edge of the side panel W. Each of the frame carriages $8_1$, $8_2$, $8_3$ can hold the side panel W in an erected attitude between the lower frame 80 and the upper frame 81 with the clamp members $82_1$, $82_2$, $82_3$, $83_1$, $83_2$, $83_3$ with the side panel W having an outer side lying in the direction of the flow on the line and facing inwardly in the transverse direction of the automobile (toward the other assembly line).

On the floor of the assembly lines, there are disposed respective pairs of left and right symmetrical outer first lower track frames $10_1$ and left and right symmetrical inner second lower track frames $10_2$ extending parallel to each other in the direction of the flow on the line. A pair of left and right symmetrical upper track frames 12 extending parallel to each other is mounted on a plurality of support columns 11 above the assembly lines.

The lower frame 80 of each of the left and right frame carriages $8_1$, $8_2$, $8_3$ is movably supported on a pair of guide rails 10a, 10a fixedly mounted on an outer side of the upper surface of the first lower track frame $10_1$ by linear guides 80a mounted on the lower frame 80 at a plurality of longitudinally spaced locations thereon. A motor 84 as a drive source is mounted on the lower frame 80 and has an output shaft supporting thereon a pinion 84a held in mesh with a rack 10b fixed to the first lower track frame $10_1$.

The upper frame 81 of each of the left and right frame carriages $8_1$, $8_2$, $8_3$ is movably supported on a pair of guide rails 12a, 12b fixedly mounted on the upper track frame 12 by linear guides 81a mounted on the upper frame 81 at a plurality of longitudinally spaced locations thereon. A motor 85 as a drive source is mounted on the upper frame 81 and has an output shaft supporting thereon a pinion 85a held in mesh with a rack 12b fixed to the upper track frame 12.

The lower frames 80 and the upper frames 81 of the left and right frame carriages $8_1$, $8_2$, $8_3$ are self-propelled in the direction of the flow on the line in synchronism with each other under synchronous control of the motors 84, 85.

When a fault such as a power failure or the like occurs, causing the motors 84, 85 to shut off unexpectedly, the lower frame 80 and the upper frame 81 which are a pair of movable frames of each of the frame carriages $8_1$, $8_2$, $8_3$, may be displaced longitudinally from each other due to different inertial forces acting thereon. When the lower frame 80 and the upper frame 81 are displaced longitudinally, the side panel W may possibly be deformed or the clamp members $82_1$ through $82_3$ may possibly be damaged. Therefore, each of the frame carriages $8_1$, $8_2$, $8_3$ has a synchronizing arrangement for preventing the lower frame 80 and the upper frame 81 from being displaced longitudinally in the even of a fault.

The synchronizing arrangement comprises a first toothed belt 86 disposed as an endless movable member along the path of movement of the lower frame 80, a second toothed belt 87 disposed as an endless movable member along the path of movement of the upper frame 81, and a belt-and-pulley transmitting means 88 for connecting the toothed belts 86, 87 for synchronous operation.

The first toothed belt 86 is trained around a pair of pulleys 86a, 86b mounted on an outer side of the first lower track frame $10_1$ in the direction of the flow on the line and longitudinally spaced from each other by a distance slightly greater than the reciprocating stroke of each of the frame carriages $8_1$, $8_2$, $8_3$. The lower frame 80 is connected to the first toothed belt 86 by a connector 86c, which is thus ganged with the lower frame 80.

The second toothed belt 87 is trained around a pair of pulleys 87a, 87b mounted on an inner side of the upper track frame 12 in the direction of the flow on the line and longitudinally spaced from each other by a distance slightly greater than the reciprocating stroke of each of the frame carriages $8_1$, $8_2$, $8_3$. The upper frame 81 is connected to the second toothed belt 7 by a connector 87c, which is thus ganged with the upper frame 81.

The belt-and-pulley transmitting means 88 has rotatable shafts 88a extending between the lower track frames $10_1$, $10_2$. The rotatable shafts 88a support thereon first toothed pulleys 88b fixed to outer ends thereof in the direction of the flow on the line and second toothed pulleys 88c fixed to inner ends thereof in the direction of the flow on the line. Third toothed pulleys 88d and fourth toothed pulleys 88e are coaxially mounted on the support columns 11. Third toothed belts 88f are trained around the second toothed pulleys 88c and the third toothed pulleys 88d. The rotatable shaft 88a, the first toothed pulleys 88b, the second toothed pulleys 88c, the third toothed pulleys 88d, the fourth toothed pulleys 88e, and the third toothed belts 88f jointly make up the belt-and-pulley transmitting means 88.

On each of the frame carriages $8_1$, $8_2$, $8_3$, the first toothed belt 86 is trained around the first toothed pulley 88b over the guide pulleys 86d, 86d, and the second toothed belt 87 is trained around the fourth toothed pulley 88e over the guide pulleys 87d, 87d. When a fault such as a power failure or the like occurs, if one of the lower frame 80 and the upper frame 81, i.e., the lower frame 80 tends to move forwardly of the upper frame 81 under inertial forces, then the inertial forces of the lower frame 80 are transmitted to the rotatable shaft 88a by the first toothed belt 86 and the first toothed pulley 88b. Then, the inertial forces are transmitted to the third toothed belt 88f by the second toothed belt 88c mounted on the rotatable shaft 88a, and then transmitted to the third pulley 88d by the third toothed belt 88f. The inertial forces are transmitted to the second toothed belt 87 by the fourth teethed pulley 88e coaxial with the third toothed pulley 88d, and finally to the upper frame 81 by the second toothed belt 87. As a result, the upper frame 81 follows the lower frame 80 in movement, and the frames 80, 81 are prevented from being displaced longitudinally with respect to each other.

The first through third toothed belts 86, 87, 88f may be replaced with chains. In the drawings, 86e, 87e, 88g represent tension pulleys.

The clamp members $82_1$ through $83_3$ are positionally adjustably mounted on the lower frame 80 and the upper frame 81 so as to be able to handle side panels W that are changed depending on the types of automobiles to be manufactured. Specifically, it is assumed that a horizontal coordinate axis substantially perpendicular to planes including the lower frame 80 and the upper frame 81 serves as an X-axis and a vertical coordinate axis perpendicular to the X-axis as a Y-axis.

Figure 5:
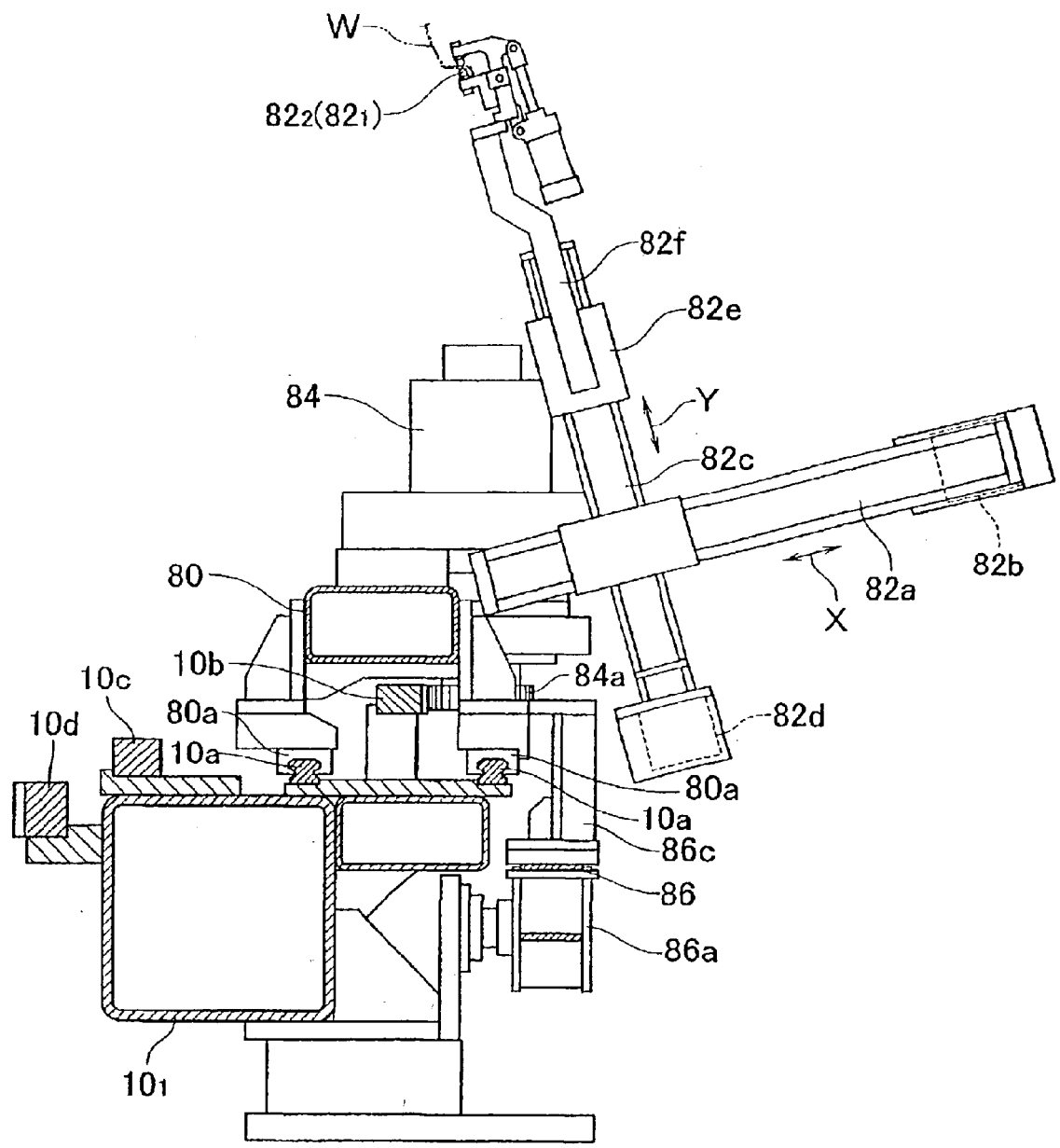
FIG. 5 is a cross-sectional view taken along line V—V of FIG. 3.

A position adjusting mechanism for the front clamp member $82_1$ and the intermediate clamp member $82_2$ which are mounted on the lower frame 80 has, as shown in FIGS. 4 and 5, a guide frame 82a fixedly mounted on the lower frame 80 and being elongate in the direction of the X-axis, and a guide frame 82c supported on the guide frame 82a and being elongate in the direction of the Y-axis. The guide frame 82c is movable in the direction of the X-axis by a servomotor 82b through a feed screw mechanism, and supports a movable body 82e thereon. The movable body 82e is movable in the direction of the Y-axis by a servomotor 82d through a feed screw mechanism, and has a support arm 82f thereon to which the clamp members $82_1$, $82_2$ are attached. As a result, the position adjusting mechanism for the clamp members $82_1$, $82_2$ comprises a two-axis orthogonal-coordinate type movable mechanism.

Figure 6:
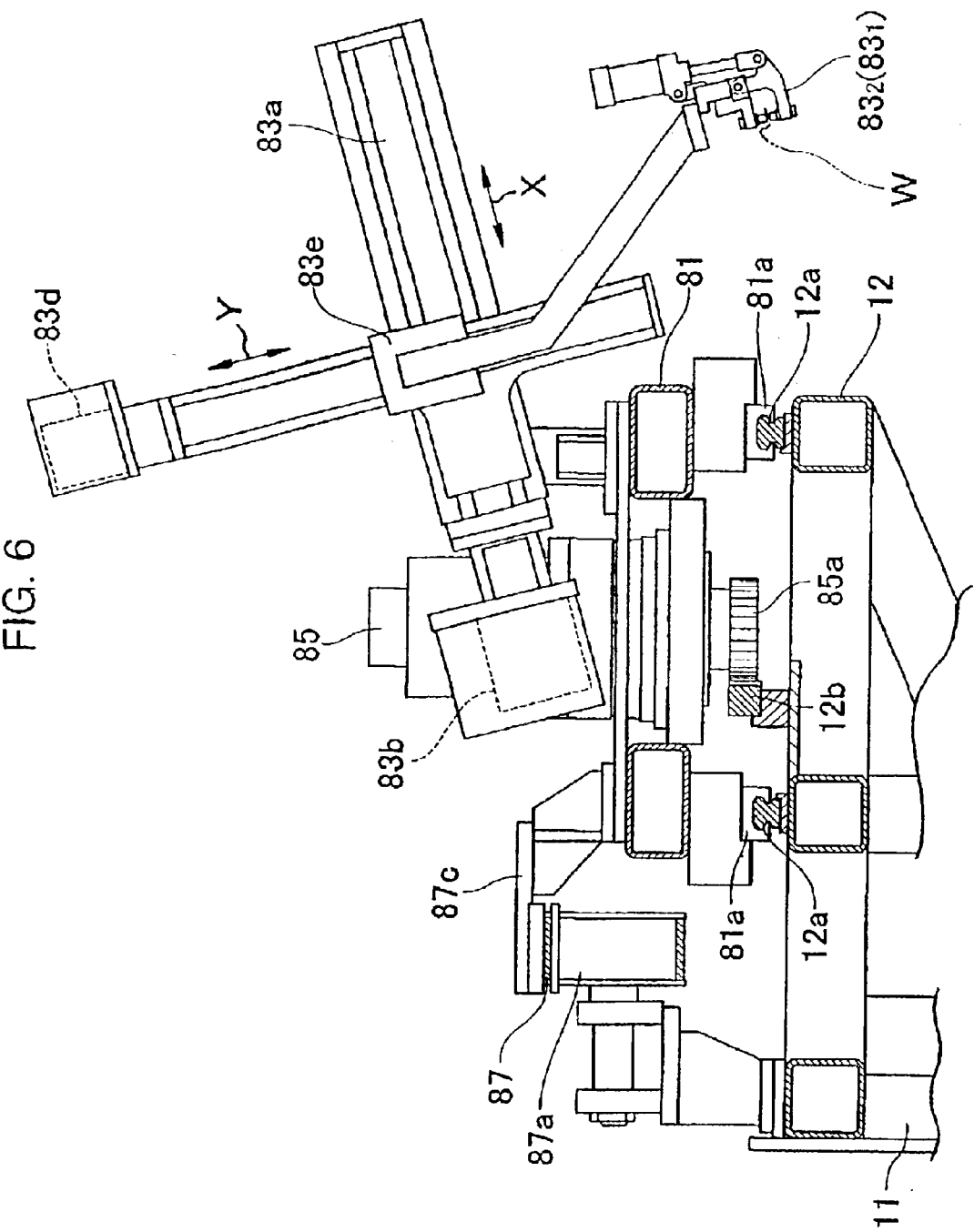
FIG. 6 is a cross-sectional view taken along line VI—VI of FIG. 3.

A position adjusting mechanism for the front clamp member $83_1$ and the intermediate clamp member $83_2$ which are mounted on the upper frame 81 has, as shown in FIGS. 4 and 6, a guide frame 83a fixedly mounted on the upper frame 81 and being elongate in the direction of the X-axis, and a guide frame 83c supported on the guide frame 83a and being elongate in the direction of the Y-axis. The guide frame 83c is movable in the direction of the X-axis by a servomotor 83b through a feed screw mechanism, and supports a movable body 83e thereon. The movable body 83e is movable in the direction of the Y-axis by a servomotor 83d through a feed screw mechanism, and has a support arm 83f thereon to which the clamp members $83_1$, $83_2$ are attached. As a result, the position adjusting mechanism for the clamp members $83_1$, $83_2$ comprises a two-axis orthogonal-coordinate type movable mechanism, as with the position adjusting mechanism for the clamp members $82_1$, $82_2$.

A position adjusting mechanism for the rear clamp member $82_3$ which is mounted on the lower frame 80 has, as shown in FIGS. 3 and 4, a guide frame 82g fixedly mounted on the lower frame 80 and being elongate in the direction of the flow on the line, and a two-axis orthogonal-coordinate type movable mechanism which is identical to those described above that is fixedly mounted on the guide frame 82g. The two-axis orthogonal-coordinate type movable mechanism has an X-axis guide frame 82a, a Y-axis guide frame 82c, a movable body 82e supporting the clamp member $82_3$ with a support arm 82f interposed therebetween, and servomotors 82b, 82d, and is supported on the guide frame 82g by the X-axis guide frame 82a. The X-axis guide frame 82a is movable in the direction of the flow on the line by a servomotor 82h through a feed screw mechanism.

A position adjusting mechanism for the rear clamp member $83_3$ which is mounted on the upper frame 81 has, as shown in FIGS. 3 and 4, has a guide frame 83g fixedly mounted on the upper frame 81 and being elongate obliquely in the vertical direction, and a two-axis orthogonal-coordinate type movable mechanism which is identical to those described above that is fixedly mounted on the guide frame 83g. The two-axis orthogonal-coordinate type movable mechanism has an X-axis guide frame 83a, a Y-axis guide frame 83c, a movable body 83e supporting the clamp member $83_3$ with a support arm 83f interposed therebetween, and servomotors 83b, 83d, and is supported on the guide frame 83g by the X-axis guide frame 83a. The X-axis guide frame 83a is movable obliquely in the vertical direction by a servomotor 83h through a feed screw mechanism.

Figure 7:
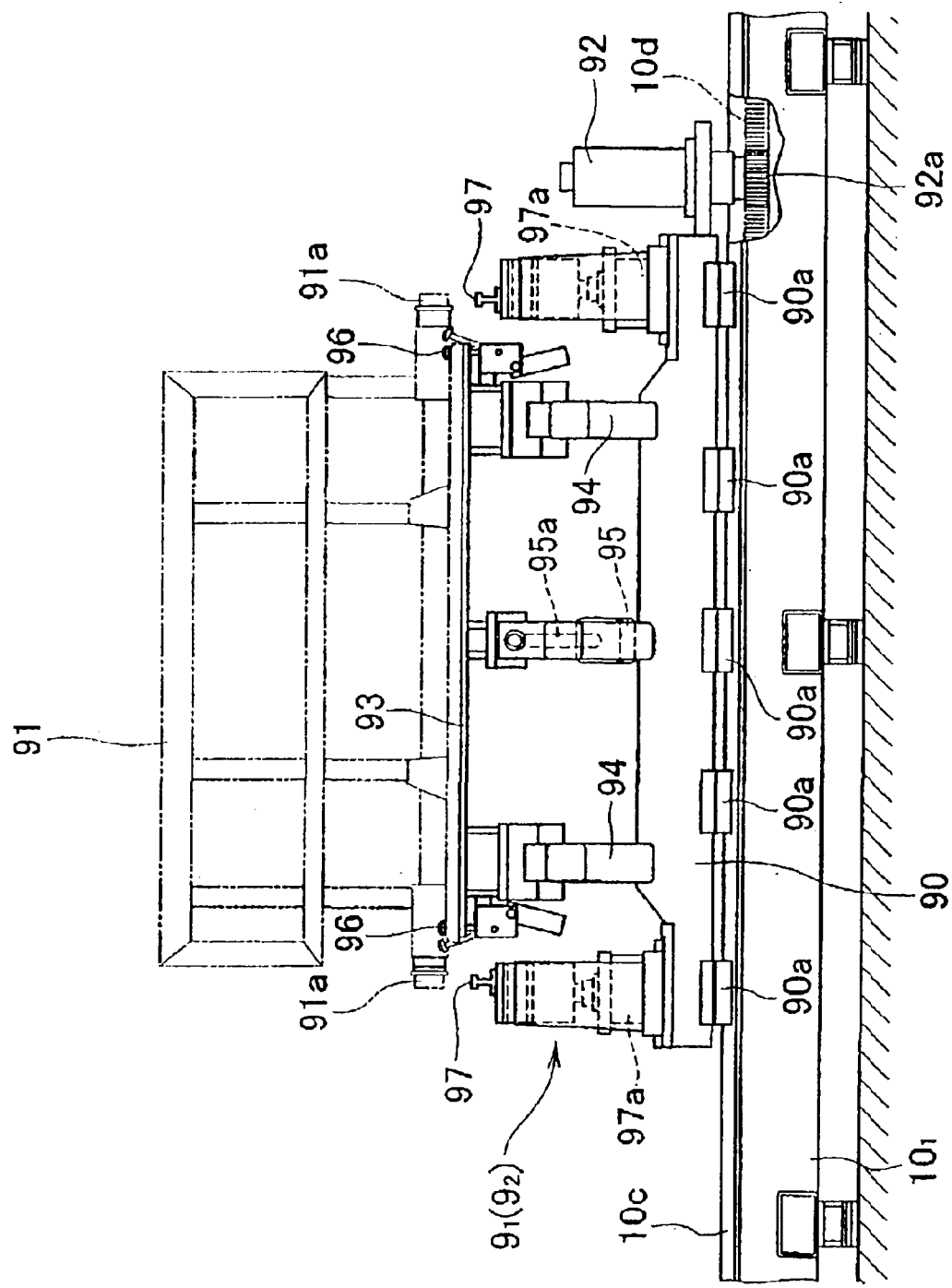
FIG. 7 is an enlarged side elevational view of a setting carriage shown in FIG. 2.
Figure 8:
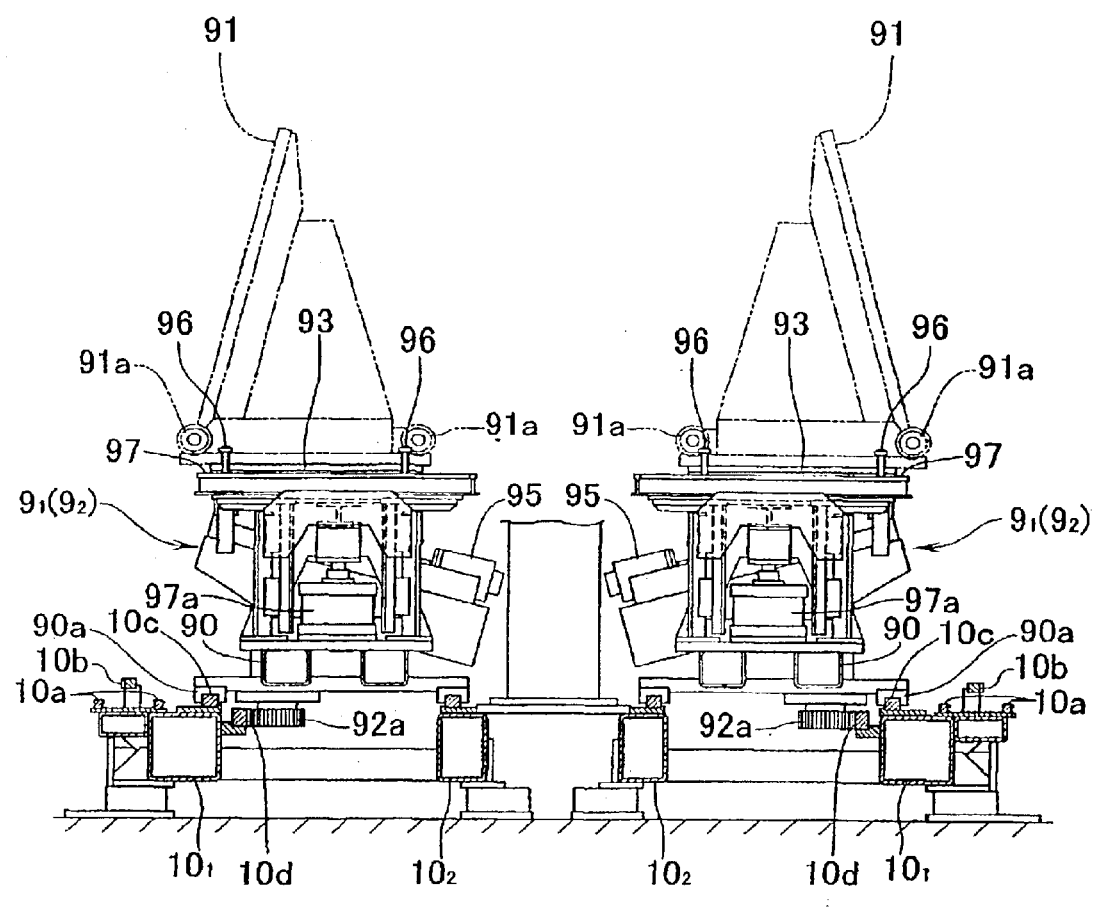
FIG. 8 is a front elevational view of the setting carriage as viewed from the left of FIG. 7.
Figure 9:
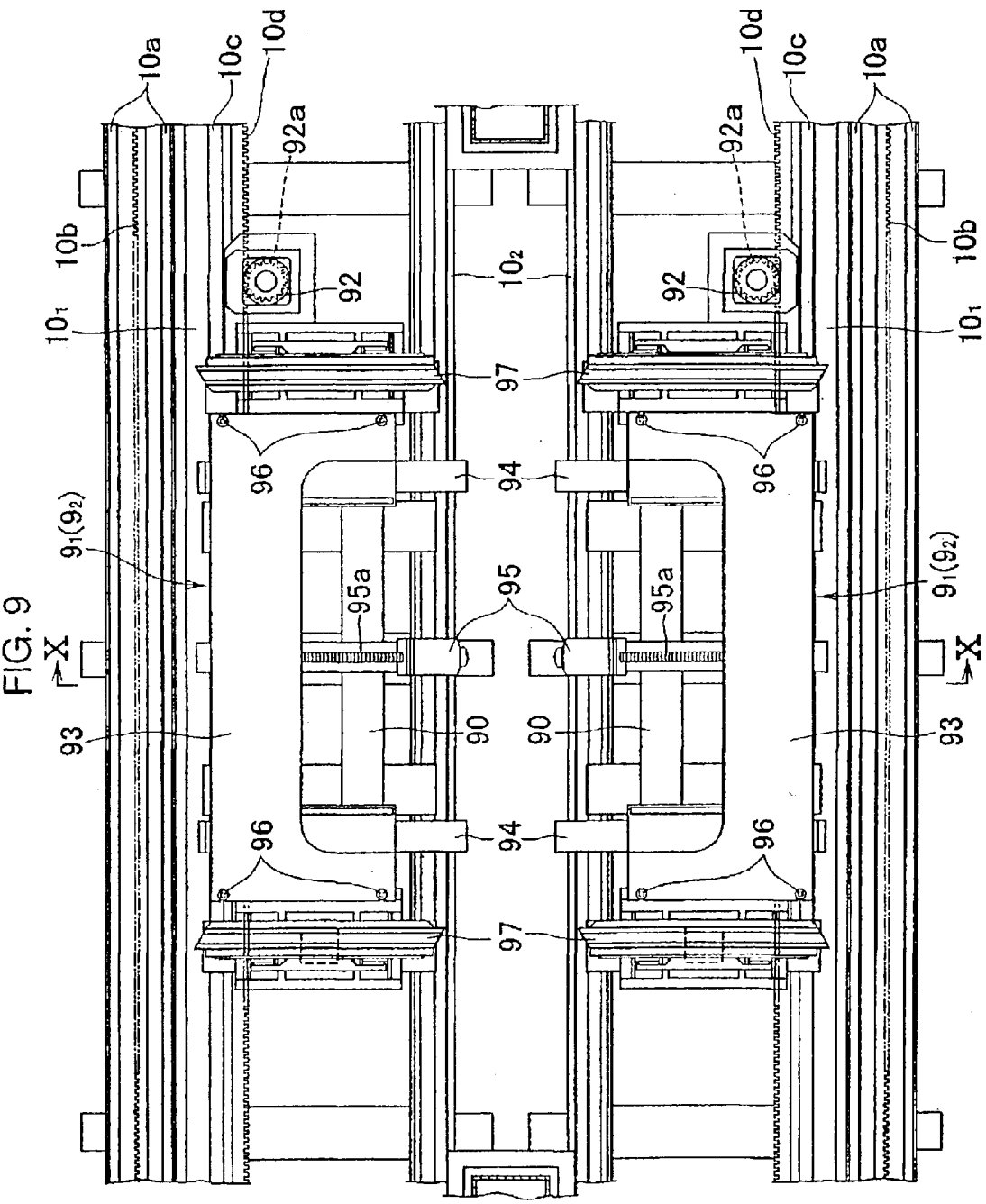
FIG. 9 is a plan view of the setting carriage with a setting jig removed.

As shown in FIGS. 7 through 9, each of the setting carriages $9_1$, $9_2$ has a carriage body 90 movably supported on guide rails 10c, 10c fixedly mounted respectively on upper surfaces of the first lower track frame $10_1$ and the second lower track frame $10_2$ by linear guides 90a disposed on opposite sides of the lower surface of the carriage body 90. A setting jig 91 having a plurality of clamp members (not shown) for clamping a side panel is mounted on the carriage body 90. The setting jig 91 is constructed to hold a side panel W in an erected attitude with its inner side facing inwardly along the direction of the flow on the line. A pinion 92a mounted on the output shaft of a motor 92 which is installed on an end of the carriage body 90 is held in mesh with a rack 10d fixed to an inner side surface of the first lower track frame $10_1$. As a result, each of the setting carriages $9_1$, $9_2$ can be self-propelled in the direction of the flow on the line along the guide rails 10c when the motor 92 operates.

Figure 10:
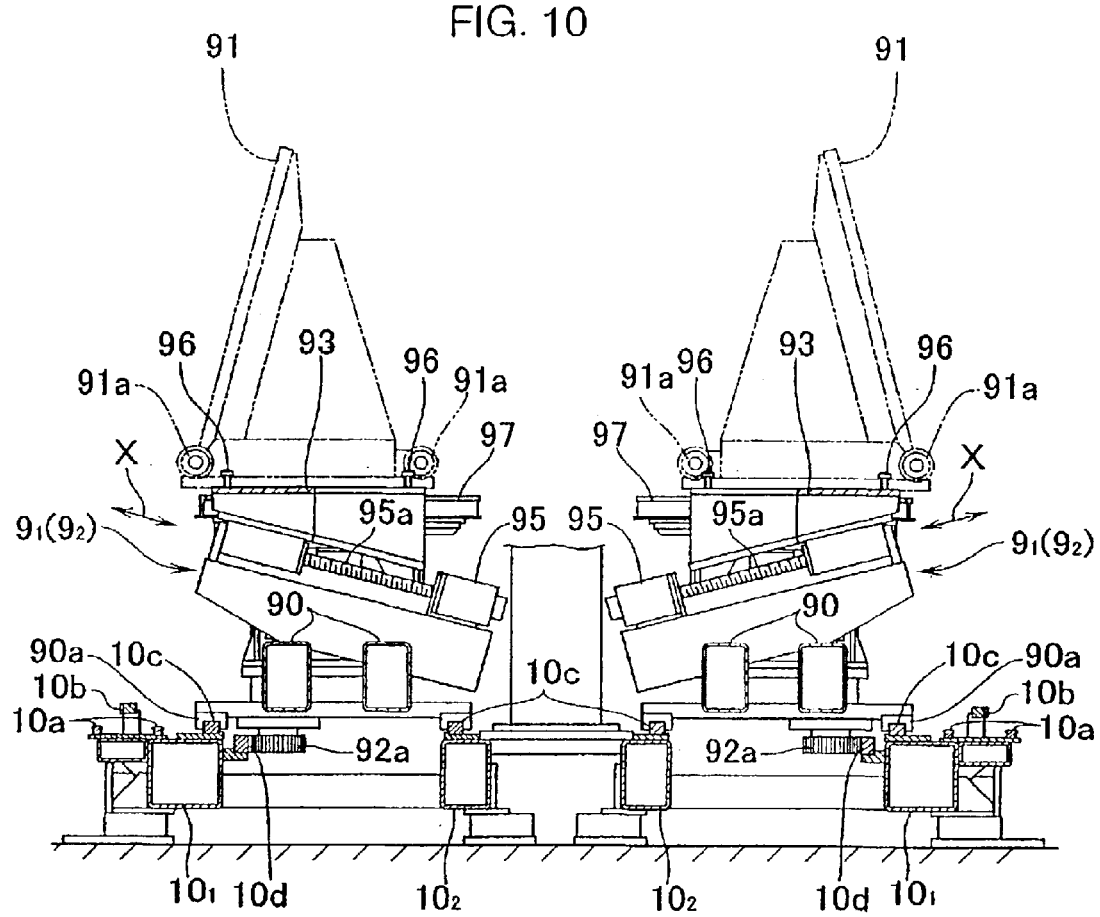
FIG. 10 is a cross-sectional view taken along line X—X of FIG. 9.

The setting jig 91 is supported on the carriage body 90 for movement in a direction perpendicular to the direction of the flow on the line between a transfer position for transferring a side panel W to and from each of the frame carriages $8_1$, $8_2$, $8_3$ and a withdrawn position for holding a side panel W. More specifically, as shown in FIGS. 9 and 10, on the carriage body 90, there are mounted a support plate 93 supporting the setting jig 91 and a plurality of front and rear guide frames 94 fixedly mounted on the setting jig 91 and being elongate in the direction of the X-axis. The support plate 93 is movable in the direction of the X-axis along the guide frames 94 by a servomotor 95 through a feed screw mechanism 95a, for moving the setting jig 91 between the transfer position which is located outwardly in the direction of the X-axis and the withdrawn position which is located inwardly in the direction of the X-axis.

The setting jig 91 comprises any one of dedicated jigs that serve to support different side panels W depending on the types of automobiles to be manufactured. The setting jig 91 is detachably supported on the support plate 93 by a plurality of jig clamps 97a mounted on the support plate 93. On front and rear ends of each of the setting carriages $9_1$, $9_2$, there are mounted respective vertically movable rails 97, 97 which can be moved upwardly and downwardly by respective cylinders 97a, with rollers 91a, 91a mounted on front and rear ends of the setting jig 91. For jig replacement, the setting jig 91 is retracted into the withdrawn position, then the jig clamps 96 are unclamped, and the vertically movable rails 97, 97 are elevated, lifting the setting jig 91 off the support plate 93 with the rollers 91a.

For assembling side panels W, an outer skin Wa of each of left and right side panels W is placed between the lower frame 80 and the upper frame 81 of each of the left and right first frame carriages $8_1$ by the outer skin charging robot 1 in the charging station ST1. Then, the outer skin Wa is held on the first frame carriage $8_1$ by the clamp members $82_1$, $82_2$, $82_3$, $83_1$, $83_2$, $83_3$ that are mounted on the lower frame 80 and the upper frame 81, and thereafter coated with a sealing agent by the coating robot 2.

Then, the first frame carriage $8_1$ is moved to the first setting station ST2, and the first frame carriage $9_1$ is moved back to the first setting station ST2. The setting jig 91 on the first frame carriage $9_1$ is advanced to the transfer position. The outer stiffener Wb, which is an inner member, is set on the outer skin Wa held by the first frame carriage $8_1$ by the inner member setting robot 3, so that the outer skin Wa and the outer stiffener Wb are held by the setting jig 91.

Then, the setting jig 91 is retracted to the withdrawn position, and the first frame carriage $9_1$ is moved back to the first welding station ST3. At the same time, the first frame carriage $8_1$ is moved back to the charging station ST1. In the first welding station ST3, the outer stiffener Wb is temporarily welded to the outer skin Wa held by the first setting carriage $9_1$ by the welding robot 4.

While the outer stiffener Wb is being temporarily welded to the outer skin Wa in the first welding station ST3, the second frame carriage $8_2$ is moved back to the first welding station ST3. After the outer stiffener Wb is temporarily welded to the outer skin Wa, the setting jig 91 on the first setting carriage 91 is advanced to the transfer position, and the outer skin Wa is transferred onto the second frame carriage $8_2$ and held by the clamp members $82_1$, $82_2$, $82_3$, $83_1$, $83_2$, $83_3$ which are mounted on the lower frame 80 and the upper frame 81 thereof.

Then, the outer stiffener Wb is additionally welded to the outer skin Wa held by the second frame carriage $8_2$ by the welding robot 4. While the outer stiffener Wb is being additionally welded to the outer skin Wa, the setting jig 91 on the first setting carriage $9_1$ is retracted to the withdrawn position, and the first setting carriage $9_1$ is moved back to the first setting station ST2.

After the outer stiffener Wb is additionally welded to the outer skin Wa, the second frame carriage $8_2$ is moved to the second setting station ST4, and the second frame carriage $9_2$ is moved back to the second setting station ST4. The setting jig 91 on the second frame carriage $9_2$ is advanced to the transfer position, and the inner members including the front pillar inner member Wc, the center pillar inner member Wd, and the rear inner member We are set on the outer skin Wa held by the second frame carriage $8_2$ by the inner member setting robot 5. The outer skin Wa and these inner members Wc, Wd, We are thus held by the setting jig 91.

The setting jig 91 is retracted to the withdrawn position, and the second frame carriage $9_2$ is moved to the second welding station ST5. At the same time, the second frame carriage $8_2$ is moved back to the first welding station ST3, and the inner members Wc, Wd, We are temporarily welded to the outer skin Wa held by the second setting carriage $9_2$ by the welding robot 6 in the second welding station ST5, thus making up the side panel W.

While the inner members Wc, Wd, We are being temporarily welded to the outer skin Wa in the second welding station ST5, thus making up the side panel W, the third frame carriage $8_3$ is moved back to the second welding station ST5. After the inner members Wc, Wd, We are temporarily welded to the outer skin Wa, the setting jig 91 on the second setting carriage $9_2$ is advanced to the transfer position, and the side panel W is transferred onto the third frame carriage $8_3$ and held by the clamp members $82_1$, $82_2$, $82_3$, $83_1$, $83_2$, $83_3$ which are mounted on the lower frame 80 and the upper frame 81 thereof. The second frame carriage $9_2$ is retracted to the withdrawn position, and then retracted to the second setting station ST4.

The inner members Wc, Wd, We are additionally welded to the side panel W held by the third frame carriage $8_3$ by the welding robot 6 in the second welding station ST5. After the inner members Wc, Wd, We are additionally welded to the side panel W, the third frame carriage $8_3$ is moved to the discharging station ST6, in which the side panel W is discharged by the discharging robot 7.

The embodiment has been described above in which the present invention is applied to the line segment extending from the first setting station ST2 through the first welding station ST3 to the second setting station ST4 serving as the next working station and the line segment extending from the second setting station ST4 through the second welding station ST5 to the discharging station ST6 serving as the next working station. In the above embodiment, the two setting stations and the two welding stations are employed. However, the present invention is also applicable to an assembly line where a single setting station and a single setting station are employed. In such a case, after all inner members are set on an outer skin in the setting station, the inner members are welded to the outer skin in the welding station, thus assembling a side panel. The side panel is then discharged in a discharging station next to the welding station.

According to a modification of the above embodiment, the assembly line may be divided into two segments with two welding stations being positioned respectively at centers thereof. An example of a layout where the assembly line is divided into two segments is illustrated in FIG. 11.

Figure 11:
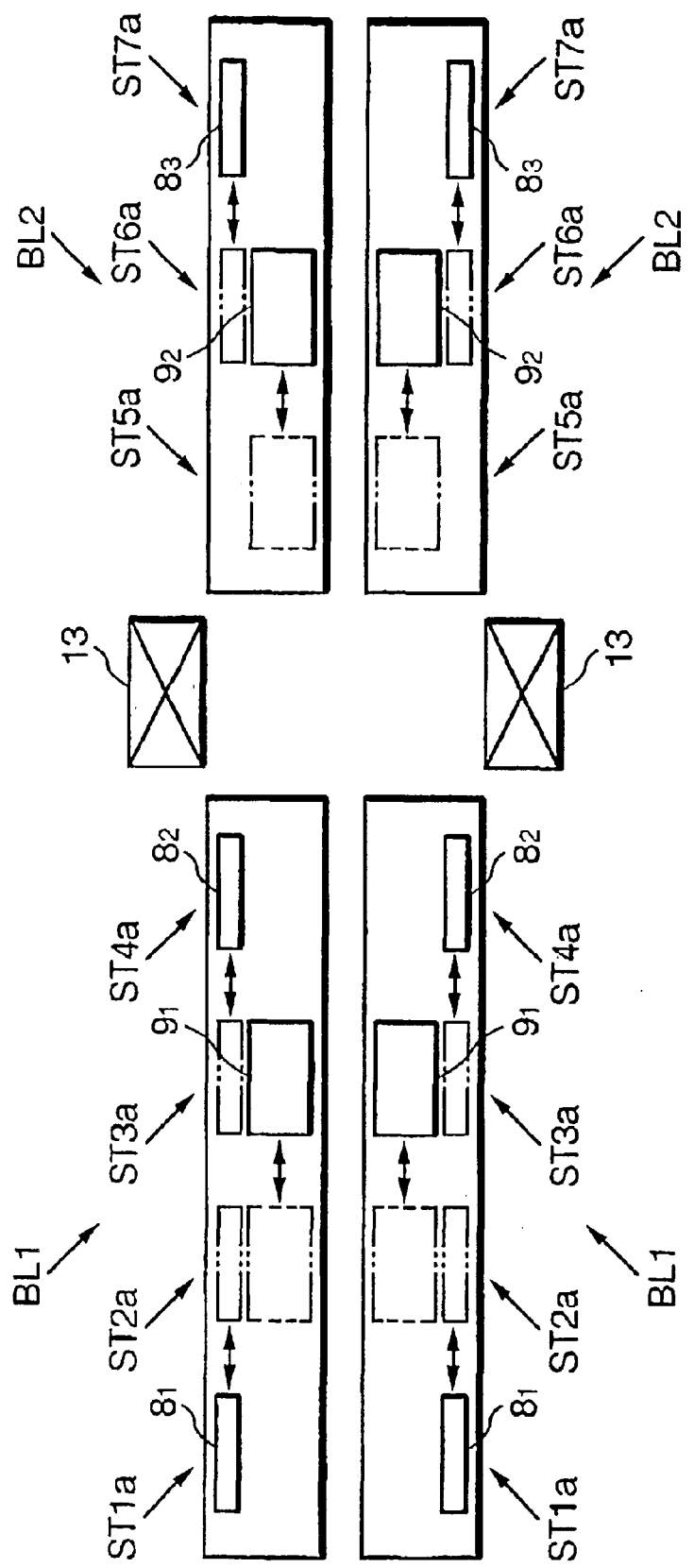
FIG. 11 is a block diagram showing a first modification of the embodiment shown in FIG. 1.

The assembly line shown in FIG. 11 has a pair of left and right symmetrical lines for assembling left and right side panels W, W, respectively. Each of the assembly lines has a first block BL1 including a charging station ST1a, a first setting station ST2a, a first welding station ST3a, and a first setting station ST4a which are arranged successively in a series in the order named from an upstream end of the line, and a second block BL2 including a second setting station ST5a, a second welding station ST6a, and a discharging station ST7a which are arranged successively in a series in the order named from an upstream end of the line, the first and second blocks BL1, BL2 being arranged in a linear array. Quality checking units 13 are disposed between the first blocks BL1 and the second blocks BL2.

In the assembly line shown in FIG. 11, the charging stations ST1a, the first setting stations ST2a, and the first welding stations ST3a are of exactly the same construction and operate in the same manner as the charging station ST1, the first setting station ST2, and the first welding station ST3 of the assembly line shown in FIG. 1. However, the assembly line shown in FIG. 11 includes the first discharging station ST4a next to the first welding stations ST3a. The outer skin Wa and the outer stiffener Wb which are held by the first setting carriage $9_1$ which is moved from the first welding station ST3a to the first discharging station ST4a are discharged toward the quality checking unit 13 by a discharging robot, not shown, in the first discharging station ST4a.

If the outer skin Wa and the outer stiffener Wb inspected by the quality checking unit 13 are not defective, then they are sent to the second setting station ST5a. The outer skin Wa and the outer stiffener Wb are placed by a charging robot, not shown, onto the second setting carriage $9_2$ which has been moved back to the second setting station ST5a, and held by the second setting carriage $9_2$.

The second setting station ST5a, the second welding station ST6a, and the discharging station ST7a of the assembly line shown in FIG. 11 are of the same construction as the second setting station ST4, the second welding station ST5, and the discharging station ST6 of the assembly line shown in FIG. 1 except that the second setting station ST5a and the charging robot. In the assembly line shown in FIG. 11, the outer skin Wa and the outer stiffener Wb held by the second setting carriage $9_2$ are operated upon in the same manner as with the assembly line shown in FIG. 1, making the side panel W, which is discharged onto an overhead conveyor, not shown, in the discharging station ST7a.

Figure 12:
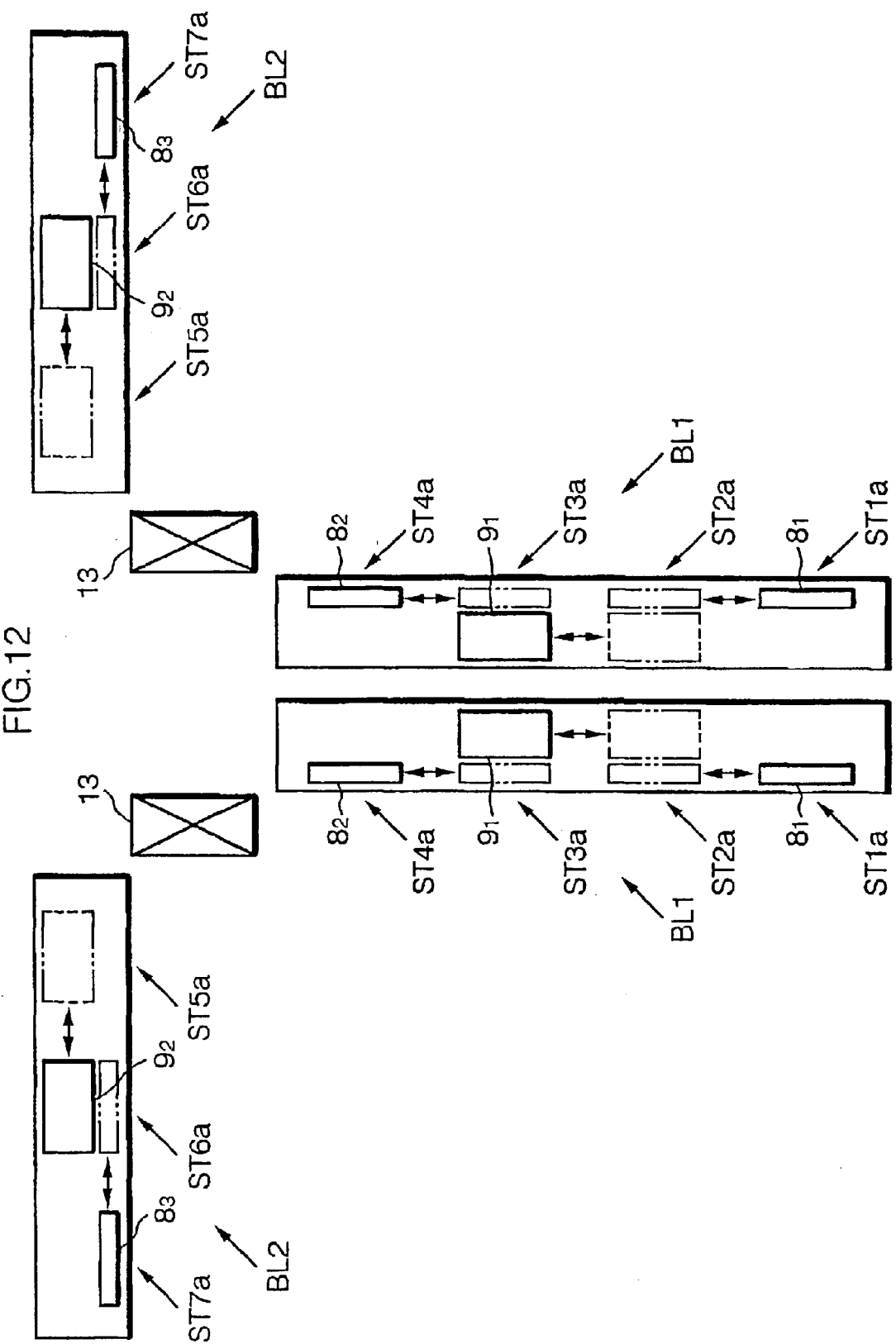
FIG. 12 is a block diagram showing a second modification of the embodiment shown in FIG. 1.

In the assembly line shown in FIG. 11, the first and second blocks BL1, BL2 are arranged in a linear array. However, as shown in FIG. 12, the left and right second blocks BL2 may be oriented at a right angle to the respective first blocks BL1, so that the assembly line is of a T shape as a whole.

In the embodiment shown in FIGS. 1 through 12 (hereinafter referred to as "first embodiment), the frame carriages $8_1$, $8_2$, $8_3$ and the setting carriages $9_1$, $9_2$ are provided in respective pairs of left and right carriages for left and right side panels W, W. However, as shown in FIGS. 13 and 14, the frame carriages $8_1$, $8_2$, $8_3$ and the setting carriages $9_1$, $9_2$ may be constructed as respective single carriages of the type which can be used for both left and right side panels W, W.

Figure 13:
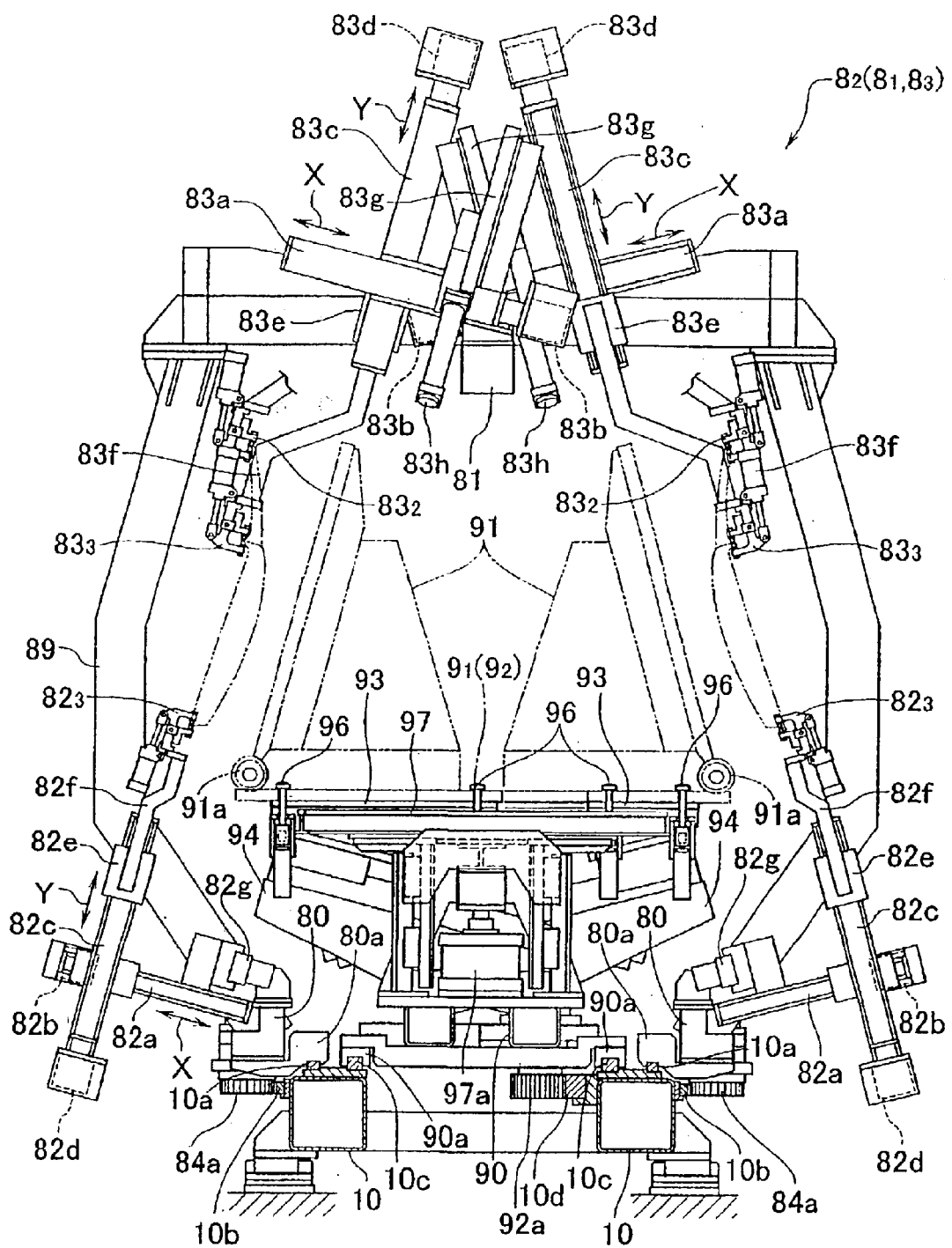
FIG. 13 is a plan view of a frame carriage and a setting carriage in another embodiment of an assembly line for assembling side panels for automobiles according to the present invention.
Figure 14:
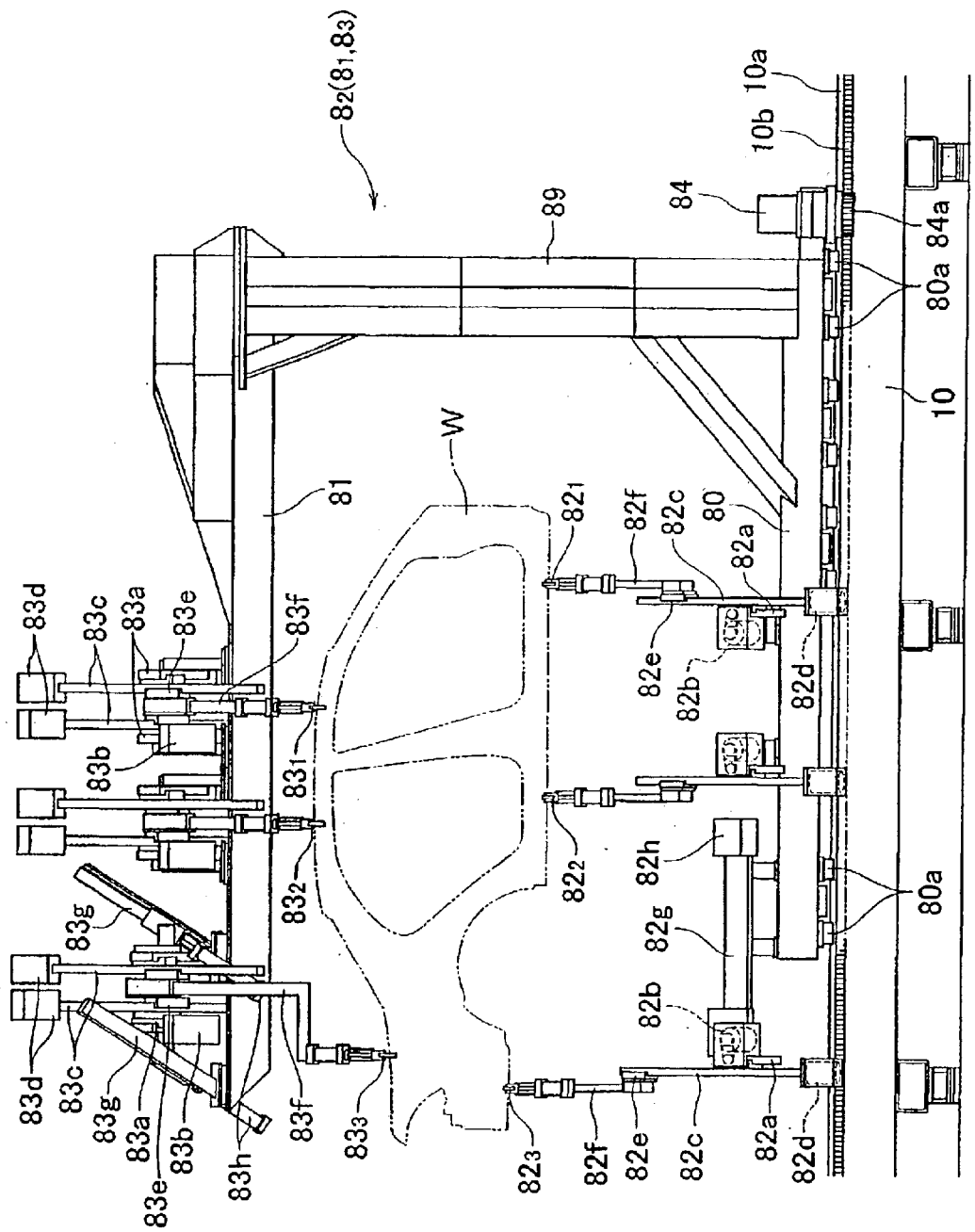
FIG. 14 is a side elevational view of a frame carriage as viewed from the right of FIG. 13.

Specifically, according to a second embodiment shown in FIGS. 13 and 14, each of the frame carriages $8_1$, $8_2$, $8_3$ comprises left and right lower frames 80, 80, a portal-shaped frame 89 disposed astride the lower frames 80, 80, and an upper frame 81 fixedly mounted on an upper portion of the portal-shaped frame 89. On the first frame carriage $8_1$, the portal-shaped frame 89 is disposed on upstream ends of the lower frames 80, 80 in the direction of the flow on the line. On the second frame carriage $8_2$ and the third frame carriage $8_3$, the portal-shaped frame 89 is disposed on downstream ends of the lower frames 80, 80 in the direction of the flow on the line.

Each of the frame carriages $8_1$, $8_2$, $8_3$ has three clamp members $82_1$, $82_2$, $82_3$ spaced in the longitudinal direction and mounted on each of the left and right lower frames 80 for clamping left and right side panels W, and three clamp members $83_1$, $83_2$, $83_3$ spaced in the longitudinal direction and mounted on each of the upper frame 81 for clamping left and right side panels W. Each of the frame carriages $8_1$, $8_2$, $8_3$ is capable of holding left and right side panels W between the left and right lower frames 80 and the upper frame 81 with the clamp members $82_1$ through $83_3$.

On the floor of the assembly lines, there are disposed left and right track frames 10, 10 parallel to each other. Each of the frame carriages $8_1$, $8_2$, $8_3$ is movably supported on guide rails 10a, 10a fixedly mounted on outer sides of the upper surface of the track frames 10, 10 by linear guides 80a mounted on the left and right lower frames 80, 80. A motor 84 is mounted on each of the lower frames 80 and has an output shaft supporting thereon a pinion 84a held in mesh with a rack 10b fixed to the outer side surface of each of the track frames 10. Each of the frame carriages $8_1$, $8_2$, $8_3$ is self-propelled along the guide rails 10a, 10b by the motor 84.

Position adjusting mechanisms for the clamp members $82_1$ through $83_3$ are of the same structure as those according to the first embodiment. Those parts of the position adjusting mechanisms which are identical to those of the first embodiment are denoted by identical reference characters, and will not be described in detail below.

Each of the setting carriages $9_1$, $9_2$ according to the second embodiment has a carriage body 90 supported by linear guides 90a on guide rails 10c, 10c fixedly mounted respectively on inner sides of upper surfaces of the left and right track frames 10, 10. A pair of left and right setting jigs 91, 91 for setting left and right side panels W, W is supported on the carriage 90 for movement in the direction of the X axis upwardly to the left and the direction of the X axis upwardly to the right, respectively. Other structural details of the setting carriages according to the second embodiment are identical to those of the setting carriages according to the first embodiment. Those parts of the setting carriages according to the second embodiment which are identical to those of the setting carriages according to the first embodiment are denoted by identical reference characters, and will not be described in detail below.

In the second embodiment, an outer skin Wa of each of left and right side panels W is placed between the left and right lower frames 80, 80 and the upper frame 81 of the first frame carriage $8_1$ by the outer skin charging robot 1 in the charging station ST1 shown in FIGS. 1 and 2. Then, the outer skin Wa is held on the first frame carriage $8_1$ by the clamp members $82_1$, $82_2$, $82_3$, $83_1$, $83_2$, $83_3$ that are mounted on the lower frame 80 and the upper frame 81, and thereafter coated with a sealing agent by the coating robot 2.

Then, the first frame carriage $8_1$ is moved to the first setting station ST2, and the first frame carriage $9_1$ is moved back to the first setting station ST2 and advanced between the left and right lower frames 80, 80 of the first frame carriage $8_1$. On the first frame carriage $8_1$, the portal-shaped frame 89 may be disposed on the downstream ends of the lower frames 80, 80 in the direction of the flow on the assembly line, but is disposed on the upstream ends of the lower frames 80, 80, thus presenting something less obstructive to the first frame carriage 9₁ moving between the lower frames 80, 80 from the downstream side.

The setting jig 91 on the first frame carriage 9₁ is advanced to the transfer position. The outer stiffener Wb, which is an inner member, is set on the outer skin Wa held by the first frame carriage 8₁ by the inner member setting robot 3, so that the outer skin Wa and the outer stiffener Wb are held by the setting jig 91.

Then, the setting jig 91 is retracted to the withdrawn position, and the first frame carriage 9₁ is moved back to the first welding station ST3. At the same time, the first frame carriage 8₁ is moved back to the charging station ST1. In the first welding station ST3, the outer stiffener Wb is temporarily welded to the outer skin Wa held by the first setting carriage 9₁ by the welding robot 4.

While the outer stiffener Wb is being temporarily welded to the outer skin Wa in the first welding station ST3, the second frame carriage 8₂ is moved back to the first welding station ST3, advancing the first setting carriage 9₁ relatively between the lower frames 80, 80. On the second frame carriage 8₂, the portal-shaped frame 89 is disposed on the downstream ends of the lower frames 80, 80 in the direction of the flow on the assembly line. Therefore, when the second frame carriage 8₂ is moved back to the first welding station ST3 from the downstream side on the assembly line, the portal-shaped frame 89 does not interfere with either the welding robot 4 as it is temporarily welding the outer stiffener Wb to the outer skin Wa or the first setting carriage 9₁.

After the outer stiffener Wb is temporarily welded to the outer skin Wa, the setting jig 91 on the first frame carriage 9₁ is advanced to the transfer position, and the outer skin Wa is transferred onto the second frame carriage 8₁ and held by the clamp members 82₁, 82₂, 82₃, 83₁, 83₂, 83₃ which are mounted on the lower frame 80 and the upper frame 81 thereof.

Then, the outer stiffener Wb is additionally welded to the outer skin Wa held by the second frame carriage 8₂ by the welding robot 4. While the outer stiffener Wb is being additionally welded to the outer skin Wa, the setting jig 91 on the first setting carriage 9₁ is retracted to the withdrawn position, and the first setting carriage 9₁ is moved back to the first setting station ST2.

After the outer stiffener Wb is additionally welded to the outer skin Wa, the second frame carriage 8₂ is moved to the second setting station ST4, and the second frame carriage 9₂ is moved back to the second setting station ST4. The setting jig 91 on the second frame carriage 9₂ is advanced to the transfer position, and the inner members including the front pillar inner member Wc, the center pillar inner member Wd, and the rear inner member We are set on the outer skin Wa held by the second frame carriage 8₂ by the inner member setting robot 5. The outer skin Wa and these inner members Wc, Wd, We are thus held by the setting jig 91.

The setting jig 91 is retracted to the withdrawn position, and the second frame carriage 9₂ is moved to the second welding station ST5. At the same time, the second frame carriage 8₂ is moved back to the first welding station ST3, and the inner members Wc, Wd, We are temporarily welded to the outer skin Wa held by the second setting carriage 9₂ by the welding robot 6 in the second welding station ST5, thus making up the side panel W.

While the inner members Wc, Wd, We are being temporarily welded to the outer skin Wa on the second setting carriage 9₂ in the second welding station ST5, thus making up the side panel W, the third frame carriage 8₃ is moved back to the second welding station ST5, advancing the second setting carriage 9₂ relatively between the lower frames 80, 80. On the third frame carriage 8₃, the portal-shaped frame 89 is disposed on the downstream ends of the lower frames 80, 80 in the direction of the flow on the assembly line. Therefore, when the third frame carriage 8₃ is moved back to the second welding station ST5 from the downstream side on the assembly line, the portal-shaped frame 89 does not interfere with either the welding robot 4 as it is temporarily welding the outer stiffener Wb to the outer skin Wa or the second setting carriage 9₂.

After the inner members Wc, Wd, We are temporarily welded to the outer skin Wa, the setting jig 91 on the second setting carriage 9₂ is advanced to the transfer position, and the side panel W is transferred onto the third frame carriage 8₃ and held by the clamp members 82₁, 82₂, 82₃, 83₁, 83₂, 83₃ which are mounted on the lower frame 80 and the upper frame 81 thereof. The second setting carriage 9₂ is retracted to the withdrawn position, and then retracted to the second setting station ST4.

The inner members Wc, Wd, We are additionally welded to the side panel W held by the third frame carriage 8₃ by the welding robot 6 in the second welding station ST5. After the inner members Wc, Wd, We are additionally welded to the side panel W, the third frame carriage 8₃ is moved to the discharging station ST6, in which the side panel W is discharged by the discharging robot 7.

With the assembly lines according to the above embodiments, as is clear from the above description, the clamp members are mounted on the frame carriage, and the side panel which has been temporarily welded is held by the clamp members and additionally welded, after which the additionally welded side panel is delivered to the next working station while being held by the frame carriage. Consequently, the cycle time can be shortened for increased productivity.

Industrial Applicability:

The present invention is applicable to an assembly line for assembling side panels for automobiles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A side panel assembly line having a setting station, a welding station, and a next working station which are successively arranged in a series in the order named, said side panel assembly line comprising:

a setting carriage supporting a setting jig for laterally holding a side panel in an erected attitude, said setting carriage being reciprocally movable between the setting station and the welding station; and a frame carriage having a lower frame and an upper frame for holding therebetween a side panel in an erected attitude with clamp members mounted thereon, said frame carriage being reciprocally movable between the welding station and the next working station for transferring directly a side panel from said setting carriage in the welding station;

wherein the side panel is temporarily welded by a welding robot disposed in said welding station before the side panel is transferred directly from said setting carriage to said frame carriage in said welding station, and the side panel is additionally welded after the side panel is transferred directly from said setting carriage to said frame carriage in said welding station, and said setting carriage or said frame carriage on which no side panel is welded is moved back while the side panel is being temporarily and additionally welded.

2. The side panel assembly line according to claim 1, wherein said welding station has a welding robot disposed at least on one side of the side panel assembly line in the direction of a flow thereon, said setting carriage being positioned on a side of said welding robot opposite to said frame carriage and supporting said setting jig for movement in a direction perpendicular to the direction of the flow on said assembly line between a transfer position for transferring said side panel to and from said frame carriage and a withdrawn position for holding the side panel.

3. The side panel assembly line according to claim 1 or 2, further comprising a pair of left and right symmetrical assembly lines for assembling left and right side panels.

4. The side panel assembly line according to claim 3, wherein said frame carriage has a lower frame and an upper frame which are separate from each other, said lower frame and said upper frame being movable synchronously under synchronous control of respective drive sources independent of each other.

5. Side panel assembly line according to claim 4, further comprising a first endless movable member disposed along the path of movement of one of said frames for movement in unison with said one of the frames, a second endless movable member disposed along the path of movement of the other of said frames for movement in unison with said other of the frames, and belt-and-pulley transmitting means for connecting the endless movable members for synchronous movement thereof.

6. The side panel assembly line according to claim 1 or 2, wherein said frame carriage comprises left and right lower frames, a portal-shaped frame disposed astride the lower frames, and an upper frame coupled to said portal-shaped frame, said setting carriage being disposed for being introduced between the lower frames of said frame carriage in the direction of the flow on said assembly line.

7. A side panel assembly line according to claim 1, wherein the frame carriage is reciprocally movable between the welding station and the next working station for directly transferring directly a side panel to a setting carriage in the next working station.

8. An assembly line for assembling side panels for automobiles, having a setting station, a welding station, and a next working station which are successively arranged in a series in the order named, said assembly line comprising:

a setting carriage for holding a side panel in an erected attitude, said setting carriage being reciprocally movable between the setting station and the welding station; and a frame carriage for holding therebetween a side panel in an erected attitude, said frame carriage being reciprocally movable between the welding station and the next working station for transferring a side panel to and from said setting carriage;

wherein said setting carriage with the side panel carried thereon is moved in said setting station to said welding station, and while the setting carriage is being moved to said welding station, said frame carriage carrying a welded side panel in said setting station is moved from said welding station to said next working station, and the welded side panel is discharged in said next working station;

the side panel carried on said setting carnage is temporarily welded in said welding station, and while the side panel is being temporarily welded, said frame carriage is moved back from said next working station to the welding station;

said side panel which is temporarily welded is transferred from said setting carriage directly to said frame carriage, the side panel carried on the frame carriage is additionally welded, and while the side panel is being additionally welded, said setting carriage is moved back to said setting station; and a next side panel is carried on said setting carriage in said setting station, the setting carriage is moved to said welding station, and while the setting carriage is being moved to said welding station, said frame carriage which carries the additionally welded side panel is moved from said welding station to said next working station.

\* \* \* \* \*